G. D. MUSSER.
FOLDING EGG CASE.
APPLICATION FILED SEPT. 16, 1915.

1,192,929.

Patented Aug. 1, 1916.
2 SHEETS—SHEET 1.

Witnesses
D. B. Galt
M. F. Mills

Inventor
George D. Musser.

By Perry H. Pattison.
Attorney

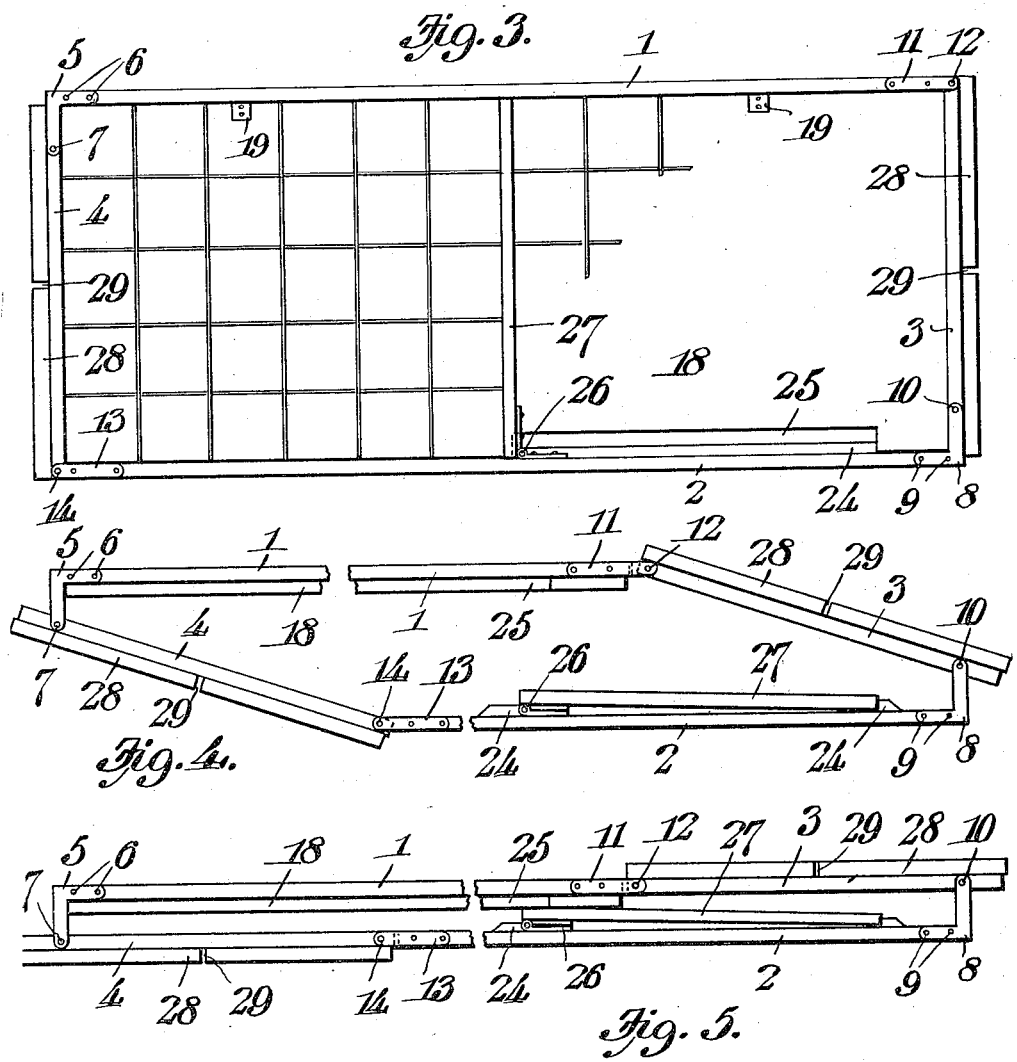

UNITED STATES PATENT OFFICE.

GEORGE D. MUSSER, OF CINCINNATI, OHIO, ASSIGNOR OF TWENTY-TWO AND ONE-HALF ONE-HUNDREDTHS TO ALBERT A. SIEBLER, TEN ONE-HUNDREDTHS TO EUGENE ADLER, AND TWENTY-TWO AND ONE-HALF ONE-HUNDREDTHS TO KATE HORWITZ.

FOLDING EGG-CASE.

1,192,929.      Specification of Letters Patent.      Patented Aug. 1, 1916.

Application filed September 16, 1915. Serial No. 51,047.

*To all whom it may concern:*

Be it known that I, GEORGE D. MUSSER, a citizen of the United States, residing at Cincinnati, in the county of Hamilton and State of Ohio, have invented certain new and useful Improvements in Folding Egg-Cases, of which the following is a specification.

This invention relates to new and useful improvements in egg crates and cases, and has for its primary object to provide an egg crate or case which when the contents have been removed can be folded for the purpose of returning the same to the original shipper.

A further object of the invention is to provide an egg case which is so constructed as to be capable of being folded to occupy but little space when in the folded position.

A further object of the invention is to provide an egg case in which a folding bottom is employed, said folding bottom serving to prevent the box from folding when in the open position.

A further object of the invention is to provide means for mounting the bottom so that it may have sliding movement relative to the side on which it is pivoted when the parts are being moved from the open to the folded position.

Figure 1:
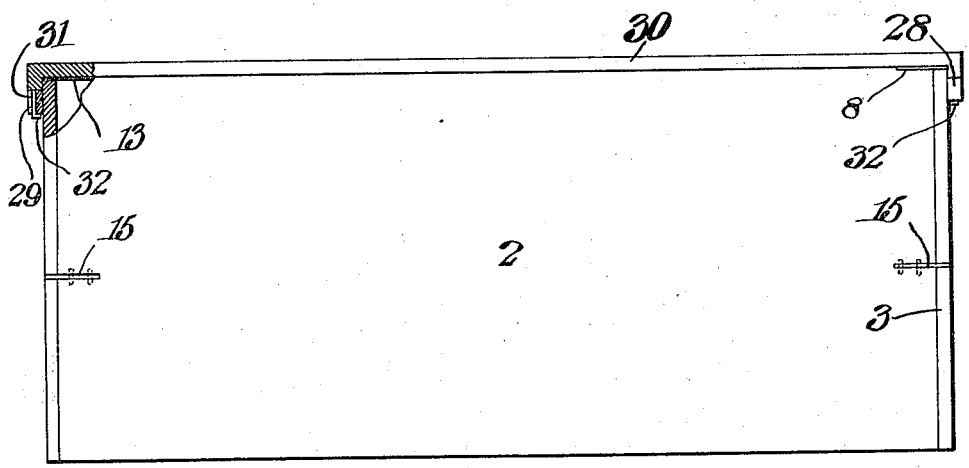
Figure 2:
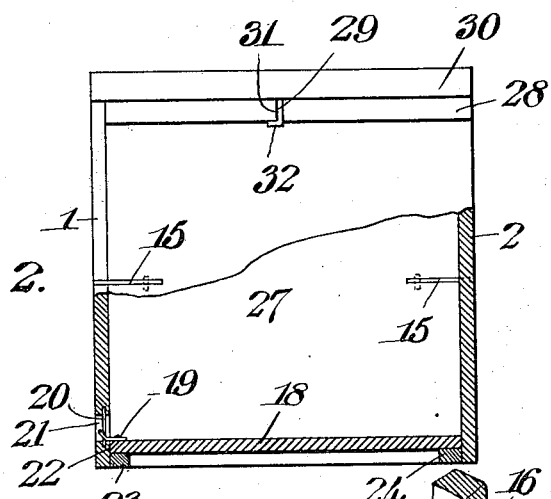
Figure 6:
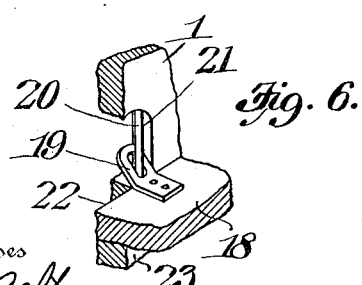

Referring to the drawings; Figure 1 is a side elevation partly in section of the egg case; Fig. 2 is a transverse sectional view thereof; Fig. 3 is a top plan view; Fig. 4 is a view showing the egg case partially folded; Fig. 5 is an edge view of the egg case in the folded position; Fig. 6 is a detail view of the means employed for pivotally fastening the bottom of the egg case to one of the sides thereof; and Fig. 7 is a detail perspective view of one of the corners.

On one of its ends the side member 1 is provided on its top and bottom edge with a right angular bracket 5, one arm of which is rigidly secured to the box side by suitable means such as 6, the other arm of said bracket being pivotally connected to the end 4 near one end thereof as at 7. The opposite end of the side member 2 is likewise provided with brackets 8 rigidly secured thereto as by means 9, and the free end of said bracket is pivoted at 10 to the member 3.

That end of the side 1 opposite to the end of which the bracket 5 is attached is provided with a metal strap 11 the free end of which overlies the end of member 3 opposite to the one to which the bracket 8 is attached, and is pivotally secured to said end as at 12. That end of the side member 2 opposite to the one to which the bracket 8 is attached is provided with a strap member 13, the free end of which overlies and is pivotally connected to the end 4 as at 14.

Figure 7:
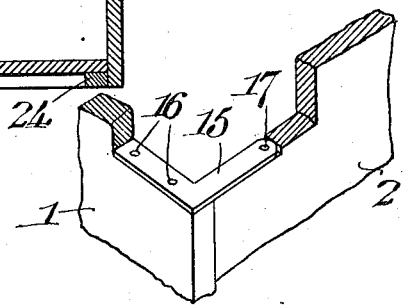

As shown in Figs. 1 and 7, each of the end and side members is connected at a point intermediate of their side edges by means of a right angular bracket 15, one arm of which is rigidly secured to the sides as at 15, the other arm being pivotally secured to the ends of the case as at 17.

Pivotally secured to the side member 1 is a bottom 18, said bottom having rigidly secured to its upper face an eye 19 through which projects a rod 20, said rod passing through a cutout portion 21 in the side of the case near the bottom thereof. The cutout portion 21 in the side of the case permits of vertical movement of the bottom in order that its inner edge 22 may clear the supporting beam 23 which is rigidly secured to the side 1 of the case on the inner face thereof. The opposite side member 2 of the case is likewise provided with a supporting beam 24 on which the free edge of the case bottom rests when in the open position.

As shown in Fig. 3, the case bottom 18 is provided with a cutout portion 25 and pivotally connected to the inner face of the side member 2 as by means of hinges 26 is a central partition 27 which divides the case into two compartments of equal dimensions.

Each end of the case is provided near its upper edge with a bar 28 which is rigidly secured thereto and intermediate of ends of said bars they are provided with vertically disposed slots 29. A top 30 is adapted to close the case, and when said top is placed in position, locking bars 31 having right angular extensions 32 lie within the slots 29 and when the locking bars are turned to the position shown in Fig. 2, the top is securely held in place by reason of the right angular extension engaging the under face of the bars 28.

When it is desired to fold the case to the position shown in Fig. 5, the cover is removed and the partition 27 is swung on its hinges 26 until it engages the inner face of the side 2. With the central partition 27 in this position, the bottom 18 of the case is permitted to swing upwardly on its pivots 19 owing to the provision of the cutout portion 25 which permits of the bottom passing the central partition 27 when the latter is in its folded position. With the parts in the above described positions it is only necessary to exert a pressure upon the sides of the case moving them upon their pivots 7—10—12 and 14 to the position shown in Fig. 5.

From the foregoing it will be seen that the present invention provides a case or crate which may be folded to occupy a comparatively small amount of space when not in use.

What is claimed is:

1. A folding crate comprising a pair of spaced side members, end members pivotally connected to the ends of the side members, a partition hinged to one of the side members, a bottom equal in width to the space between the side members, and pivotally secured to the opposite side member, and provided with a slot equal in length to the length of the partition to permit of its clearing the partition when in its folded position, and members carried by the lower edges of the side members and extending throughout their length to support the bottom when in its extended position.

2. A folding crate comprising a pair of spaced side members, end members pivoted to the ends of the side members, right angular members rigidly secured to the side members and pivotally connected to the end members, a partition pivotally connected to one of the side members, and a bottom pivotally connected to the opposite side member, and provided with a cut out portion intermediate its ends to permit of its clearing the partition when the same is folded against its respective side member and to permit of the bottom folding against the side member to which it is pivotally connected.

In testimony whereof I affix my signature in presence of two witnesses.

GEORGE D. MUSSER.

Witnesses:
 LOUIS WAILAND,
 H. WOLFSON.

Copies of this patent may be obtained for five cents each, by addressing the "Commissioner of Patents, Washington, D. C."